Patented Oct. 3, 1933

1,929,373

UNITED STATES PATENT OFFICE 1,929,373

PROCESS FOR THE PRODUCTION OF PRODUCTS HAVING HIGH STABILITY TO ATTRITION FROM RUBBER MATERIALS

Hermann Mark, Mannheim, and Heinrich Hopff, Ludwigshafen-on-the-Rhine, Germany, assignors to I. G. Farbenindustrie Aktiengesellschaft, Frankfort-on-the-Main, Germany No Drawing. Application October 29, 1930, Serial No. 492,081, and in Germany November 8, 1929

10 Claims. (Cl. 260—1)

The present invention relates to the production of products having high stability to attrition from rubber materials.

The stability to attrition of vulcanized vegetable rubber such as India rubber, balata, guttapercha and the like, or of mixtures of these different kinds of rubber with each other or with the so-called synthetic rubber i. e. the products obtained by polymerization of diolefines, is different and depends to a high degree on the internal structure of these substances. While in India rubber the single chains of polyprenes (polymerized isoprene) are arranged parallel to each other, the polymerization products of the aforesaid hydrocarbons are usually built up of strongly interlaced cyclic net-like structure in which the single chains are connected with each other. A direct connection between the degree of this net-like internal structure on the one hand and the increased stability to attrition of these products on the other hand can be clearly noticed.

Whether the materials have a parallel or net-like structure may be ascertained by means of Röntgenographic methods. When products having parallel structure are extended they always yield diagrams resembling those of vegetable or animal fibres, such as of cotton or silk, while materials having a net-like structure, even when in an extremely strongly extended condition, yield no diagrams, and therefore behave as amorphous substances. By combined Röntgenographic and mechanical experiments it has been established to what extent the attrition value important for the industrial quality of the commodities prepared from these substances is dependent on this internal structure.

We have now found that vulcanization products having a particularly high stability to attrition can be obtained from natural rubber materials such as India rubber, balata, guttpercha and like vegetable rubber, or the mixtures mentioned above, by causing therein a net-like combination of the parallel hydrocarbon chains. This is effected by acting on the said substances, or mixtures, suspensions or solutions thereof, with mixed organic-inorganic oxonium compounds, such as are obtained for example from aluminium halides, such as aluminium chloride or bromide, tin tetrachloride and the like or concentrated sulphuric acid, and halides or anhydrides of carboxylic acids or organic oxygen bearing compounds free from aldehyde groups, as for example ethers, preferably with the exclusion of oxygen. Suitable acid halides or anhydrides are for example acetic anhydride, acetyl or phthalyl chlorides or phosgene. The reaction is usually carried out at room temperature but it may be accelerated by warming to, say, up to 100° C. In most cases it is advantageous to carry out the reaction in the presence of an inert organic solvent, i. e. an organic solvent which is not attacked under the conditions of working, as for example carbon disulphide, benzine, benzene or the like or mixtures thereof. The quantity of the said oxonium compounds is generally about the same as that of the rubber material employed but it may be reduced to about one half that quantity or increased to double that quantity or more.

According to the present invention products are obtained which show characteristic differences from the initial materials. For example they have a lower or higher solubility than the untreated initial material, they have smaller bromine or chlorine-iodine values and they are less extensible than India rubber, and even in an extremely extended state give little or no indication of a definite X-ray diagram. The resulting products which have a strongly branched or net-like structure may be rolled, masticated, vulcanized, incorporated with any fillers and worked up in any industrial manner in the same way as ordinary smoked sheets. They may also be mixed with untreated rubber, and in some cases with reclaimed rubber which may be partially decomposed, or with polymerization products of diolefines. In all cases products having substantially higher stability to attrition are obtained.

The following examples will further illustrate the nature of this invention, but the invention is not restricted to these examples. The parts are by weight.

*Example 1*

25 parts of phthalyl chloride and 5 parts of anhydrous aluminium chloride are added to 500 parts of a 5 per cent solution of India rubber in benzene. The mixture is allowed to stand for 25 hours at room temperature. By precipitation with alcohol a colourless jelly is obtained which to a large extent is rendered cyclic and furnishes, on vulcanization, products the stability to attrition of which is considerably increased in comparison with that of products obtained from the same rubber without pretreatment.

*Example 2*

A mixture of 30 parts of ethyl ether and 40 parts of sulphuric acid is added while stirring to 500 parts of a 4 per cent solution of India rubber in carbon disulphide. After 15 hours the solvent is expelled and the product washed with water. A pale hard mass is obtained which consists to a large extent of rubber which has been rendered cyclic and furnishes, on vulcanization, products the stability to attrition of which is considerably increased in comparison with that of products obtained from the same rubber without pretreatment.

*Example 3*

500 parts of a 5 per cent solution of India rubber in benzene are mixed with 25 parts of the complex compound of one molecular proportion of aluminium chloride and two molecular proportions of phosgene, obtainable by heating one molecular proportion of aluminium chloride with about three molecular proportions of phosgene in a closed pressure-tight vessel to 70° C. and distilling off the remainders of phosgene in vacuo at 30° C., and the whole is stirred for 5 hours at 18° C. The reaction product is poured into water, the benzene is blown off with the aid of steam and the white powder obtained is washed with aqueous hydrochloric acid and with water and finally dried.

Instead of the aforesaid complex compound, the complex compounds of one molecular proportion of aluminium chloride and one molecular proportion of acetyl chloride or of benzoyl chloride and similar complex compounds may be employed.

*Example 4*

100 parts of a 10 per cent solution of zinc chloride in acetic anhydride are dropped while stirring into 500 parts of a 5 per cent, highly viscous solution of India rubber in benzene. After some time the viscosity of the reaction mixture decreases and after stirring for two hours at room temperature the reaction product is poured into water and the benzene is driven off with the aid of steam. A pale yellowish, tough product is obtained which, in contrast to the initial India rubber dissolves at once in benzene with the formation of a solution of low viscosity.

If the action of the complex compounds of acetic anhydride and zinc chloride be not stopped after two hours, but is proceeded with for 48 hours, the whole mixture is converted into a stiff jelly which, after working up in the manner described. furnishes a pale yellow product which is insoluble in the organic solvents usually employed for dissolving India rubber such as benzene.

*Example 5*

50 parts of a 10 per cent solution of sulphuric acid monohydrate in acetic anhydride are dropped into 200 parts of a 5 per cent solution of India rubber in benzene while stirring. The reaction mixture is then kept standing for 48 hours and worked up as described in Example 4. A brownish tough product is obtained which is insoluble in the solvents usually employed for dissolving India rubber, but swells therein.

*Example 6*

A solution of 10 parts of anhydrous zinc chloride in 40 parts of anhydrous ethyl alcohol is dropped while stirring into 200 parts of a five per cent solution of India rubber in benzene. After stirring for 5 hours the reaction product is worked up as described in Example 4. A yellowish product is obtained which is distinguished from the initial India rubber by its increased solubility in benzene, benzine or like solvents for India rubber and furnishes with these solvents solutions having a very low viscosity.

What we claim is:—

1. The process for the production of products having in the vulcanized state an increased stability to attrition, which comprises acting on a rubber material consisting of polymers of diolefines with an organic-inorganic oxonium compound.

2. The process for the production of products having in the vulcanized state an increased stability to attrition, which comprises acting on a rubber material consisting of polymers of diolefines with an organic-inorganic oxonium compound in the presence of an inert solvent.

3. The process for the production of products having in the vulcanized state an increased stability to attrition, which comprises acting on a rubber material consisting of polymers of diolefines with an organic-inorganic oxonium compound of a metal halide capable of hydrolyzing in the presence of water and an acyl halide.

4. The process for the production of products having in the vulcanized state an increased stability to attrition, which comprises acting on a rubber material consisting of polymers of diolefines with an organic-inorganic oxonium compound of a metal halide capable of hydrolyzing in the presence of water and an acyl halide in the presence of an inert solvent.

5. The process for the production of products having in the vulcanized state an increased stability to attrition, which comprises acting on a rubber material consisting of polymers of diolefines with an organic-inorganic oxonium compound of aluminium chloride and an acyl halide.

6. The process for the production of products having in the vulcanized state an increased stability to attrition, which comprises acting on a rubber material consisting of polymers of diolefines with an organic-inorganic oxonium compound of sulphuric acid and an organic oxygen bearing compound free from aldehyde groups capable of forming oxonium compounds.

7. The process for the production of products having in the vulcanized state an increased stability to attrition, which comprises acting on a rubber material consisting of polymers of diolefines with an organic-inorganic oxonium compound of an aliphatic ether and concentrated sulphuric acid.

8. The process for the production of products having in the vulcanized state an increased stability to attrition, which comprises acting on a rubber material consisting of polymers of diolefines in the presence of an inert solvent with an organic-inorganic oxonium compound formed from a metal halide, capable of hydrolyzing in the presence of water, and an organic oxygen compound selected from the class consisting of anhydrides of carboxylic acids, acyl halides and ethers.

9. The process for the production of products having in the vulcanized state an increased stability to attrition, which comprises acting on a rubber material consisting of polymers of diolefines at a temperature ranging from ordinary temperature to 100° C. in the presence of an inert solvent with an organic-inorganic oxonium compound formed from a metal halide, capable of hydrolyzing in the presence of water, and an organic oxygen compound selected from the class consisting of anhydrides of carboxylic acids, acyl halides, and ethers.

10. The process for the production of products having in the vulcanized state an increased stability to attrition, which comprises acting on a rubber material consisting of polymers of di-olefines in the presence of an inert solvent with from half to twice the weight of said rubber material of an organic-inorganic oxonium compound formed from a metal halide, capable of hydrolyzing in the presence of water, and an organic oxygen compound selected from the class consisting of anhydrides of carboxylic acids, acyl halides and ethers.

HERMANN MARK.
HEINRICH HOPFF.